United States Patent
Jian et al.

(10) Patent No.: US 10,702,988 B2
(45) Date of Patent: Jul. 7, 2020

(54) METHOD AND SYSTEM FOR LOAD ESTIMATION AND GRAVITY COMPENSATION ON A ROBOTIC ARM

(71) Applicant: HIWIN TECHNOLOGIES CORP., Taichung (TW)

(72) Inventors: Jia-Huei Jian, Taichung (TW); Cheng-Chin Chen, Taichung (TW); Jung-Fu Hou, Taichung (TW)

(73) Assignee: Hiwin Technologies Corp., Taichung (TW)

(*) Notice: Subject to any disclaimer, the term of this patent is extended or adjusted under 35 U.S.C. 154(b) by 311 days.

(21) Appl. No.: 15/972,459

(22) Filed: May 7, 2018

(65) Prior Publication Data
US 2019/0084154 A1    Mar. 21, 2019

(30) Foreign Application Priority Data

Sep. 21, 2017  (TW) .............................. 106132465 A

(51) Int. Cl.
B25J 9/16    (2006.01)
G01L 5/22    (2006.01)
G01L 25/00   (2006.01)

(52) U.S. Cl.
CPC ........... B25J 9/1633 (2013.01); B25J 9/1692 (2013.01); G01L 5/226 (2013.01); G01L 25/003 (2013.01); G05B 2219/39194 (2013.01)

(58) Field of Classification Search
CPC ...... B25J 9/1633; B25J 9/1692; B25J 9/0003; B25J 9/1628; B25J 9/1674; B25J 9/1607;
(Continued)

(56) References Cited

U.S. PATENT DOCUMENTS 5,767,648 A  *  6/1998  Morel ................... B25J 9/1628
                                                  318/568.1
6,459,955 B1 * 10/2002  Bartsch ..................... A47L 9/00
                                                  700/245

(Continued)

FOREIGN PATENT DOCUMENTS

JP    H10138187 A    5/1998
JP    3698770 B2     9/2005
JP    5327722 B2    10/2013

OTHER PUBLICATIONS

Kirchhoff et al., Robust trajectory tracking control for an ultra lightweight tendon driven series elastic robot arm, 2016, IEEE, p. 1297-1304 2016 (Year: 2016).*

(Continued)

*Primary Examiner* — Mcdieunel Marc
(74) *Attorney, Agent, or Firm* — Rosenberg, Klein & Lee

(57) ABSTRACT

A method for load estimation and gravity compensation on a robotic arm including a joint is provided, and includes: receiving a first torque signal and a first joint angle when the arm is at a first position and subjected to a current load; generating a first torque value, correction parameters, and no-load and maximum-load torque values; changing the load applied to the arm to an unknown load; receiving a second torque signal and generating a second torque value; estimating an estimated load value of the unknown load; moving the arm to a second position; receiving a second joint angle; and generating a compensating torque value and outputting the compensating torque value to a driver module of the arm.

13 Claims, 8 Drawing Sheets

(58) Field of Classification Search
CPC ....... B25J 9/1676; B25J 9/1685; G01L 5/226;
G01L 25/003; G05B 2219/39194; A47L
9/00; A61B 5/1038; A61B 5/4528; B62D
57/032; B08B 3/024
See application file for complete search history.

(56) References Cited

U.S. PATENT DOCUMENTS

| | | | | |
|---|---|---|---|---|
| 6,804,579 | B1* | 10/2004 | Laski | B08B 3/024 |
| | | | | 318/568.11 |
| 7,330,775 | B2* | 2/2008 | Orita | B62D 57/032 |
| | | | | 318/568.11 |
| 7,623,944 | B2* | 11/2009 | Dariush | A61B 5/4528 |
| | | | | 318/560 |
| 7,684,896 | B2* | 3/2010 | Dariush | A61B 5/1038 |
| | | | | 318/560 |
| 8,024,071 | B2* | 9/2011 | Komatsu | B25J 9/0003 |
| | | | | 318/568.22 |
| 2013/0006422 | A1* | 1/2013 | Komatsu | B25J 9/1674 |
| | | | | 700/258 |
| 2015/0209961 | A1* | 7/2015 | Komatsu | B25J 9/1676 |
| | | | | 700/255 |
| 2017/0266811 | A1* | 9/2017 | Ogawara | B25J 13/085 |
| 2018/0169854 | A1* | 6/2018 | Shiratsuchi | B25J 9/042 |
| 2018/0361580 | A1* | 12/2018 | Takamura | B25J 9/1607 |

OTHER PUBLICATIONS

Solazzi et al., An interaction torque control improving human force estimation of the rehab-exos exoskeleton, 2014, IEEE, p. 187-193 (Year: 2014).*

Wahrburg et al., Contact force estimation for robotic assembly using motor torques, 2014, IEEE, p. 1252-1257 (Year: 2014).*

Adamson et al., Control of Modular Robot with Parameter Estimation Using Genetic Algorithms, 2007, IEEE, p. 1-6 (Year: 2007).*

Search Report Appended to an Office Action Issued to Taiwanese Counterpart Application No. 106132465 by the TIPO dated Feb. 22, 2018, and an English Translation Thereof.

* cited by examiner

METHOD AND SYSTEM FOR LOAD ESTIMATION AND GRAVITY COMPENSATION ON A ROBOTIC ARM

CROSS-REFERENCE TO RELATED APPLICATION

This application claims priority of Taiwanese Patent Application No. 106132465, filed on Sep. 21, 2017.

FIELD

The disclosure relates to a method and a system for load estimation and gravity compensation, and more particularly to a method and a system for load estimation and gravity compensation on a robotic arm.

BACKGROUND

Robotic arms have been utilized in a wide range of industries thanks to certain characteristics thereof such as high durability, automatic control, and high precision. In compliance control of a robotic arm, the robotic arm is subjected to an external load during operation (operated alone or by an operator in a man-machine operation), and some parameters associated with an output of the robotic arm need to be adjusted according to the external load in order to output a torque that can achieve gravity compensation, thereby ensuring normal operation under the external load.

Achieving the effect of gravity compensation in response to a change in subjected load applied to the robotic arm involves obtaining an amount of the change in the subjected load in advance. One way to do so is to measure a weight of the external load and input a measured weight to the robotic arm before the external load is applied to the robotic arm. In this way, a processor of the robotic arm is able to calculate the parameters to be adjusted based on the measured weight.

Another way involves installing a torque sensor on each joint of the robotic arm and, after the external load is applied to the robotic arm, calculating a change in a torque sensed by each torque sensor to obtain the amount of the change in the subjected load of the robotic arm in comparison to a previously applied load. U.S. Pat. No. 9,533,414 B2 discloses a torque detecting method for an arm device. In the torque detecting method, for the external load applied to the arm device, a mechanical deviation is detected, and a gravity coefficient corresponding with a specific rotational angle of the arm device is calculated. Then, a gravitational torque based on a position of the arm device and the gravity coefficient is calculated. Afterward, using a calibration process, an actual output torque is calculated based on an operating torque detected by the torque sensor and the gravitational torque.

SUMMARY

One object of the disclosure is to provide a method for load estimation and gravity compensation.

According to one embodiment of the disclosure, the method for load estimation and gravity compensation is for use with a robotic arm. The method is implemented by a load estimation and gravity compensation system. The robotic arm includes at least one joint and a driver module that is installed on the at least one joint. The load estimation and gravity compensation system includes a signal processor that is coupled to the driver module, a load estimation module that corresponds with the at least one joint and that is coupled to the signal processor, and a gravity compensation module that is coupled to the load estimation module. The load estimation module includes a gravity module correction unit, a virtual robotic arm unit and a computing component. The method includes steps of:

operating the driver module in a manipulating mode to move the robotic arm to a first position, and switching the driver module to a location control mode, the robotic arm being subjected to a current load at the first position;

receiving a first torque signal and a first joint angle outputted by the driver module in the location control mode, the first torque signal being associated with the current load, the first joint angle being associated with the joint at the first position;

upon receipt of the first torque signal, converting, by the signal processor, the first torque signal into a first torque value;

upon receipt of the first torque value, generating, by the gravity module correction unit, a set of correction parameters;

upon receipt of the set of correction parameters and the first joint angle, generating, by the virtual robotic arm unit, a no-load torque value and a maximum-load torque value;

changing the load subjected to the robotic arm to an unknown load;

receiving a second torque signal outputted by the driver module, the second torque signal being associated with the unknown load;

upon receipt of the second torque signal, converting, by the signal processor, the second torque signal into a second torque value;

estimating, by the computing component, an estimated load value of the unknown load based on the first torque value, the no-load torque value, the maximum-load torque value and the second torque value;

switching the driver module to a torque control mode, and moving the robotic arm to a second position;

receiving a second joint angle outputted by the driver module, the second joint angle being associated with the second position; and generating, by the gravity compensation module, a compensating torque value based on the estimated load value and the second joint angle, and outputting the compensating torque value to the driver module.

Another object of the disclosure is to provide a load estimation and gravity compensation system that is capable of implementing the above-mentioned method.

According to one embodiment of the disclosure, the load estimation and gravity compensation system is for use with a robotic arm. The robotic arm includes at least one joint and a driver module that is installed on the at least one joint. The load estimation and gravity compensation system includes:

a signal processor to be coupled to the driver module for receiving a first torque signal and a first joint angle therefrom when the robotic arm is subjected to a current load, and for converting the first torque signal to a first torque value, wherein the signal processor further receives a second torque signal and a second joint angle from the driver module when the robotic arm is subjected to an unknown load, and converts the second torque signal to a second torque value;

a load estimation module that corresponds with the at least one joint, that is coupled to the signal processor for receiving the first and second torque values therefrom, and that is programmed to generate a set of correction parameters based on the first torque value, generate a no-load torque value and a maximum-load torque value based on the set of correction parameters and the first joint angle, and estimate an estimated load value of the unknown load based on the first torque value, the no-load torque value, the maximum-load torque value and the second torque value; and a gravity compensation module coupled to the load estimation module for generating a compensating torque value based on the estimated load value and the second joint angle, and outputting the compensating torque value to the driver module.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
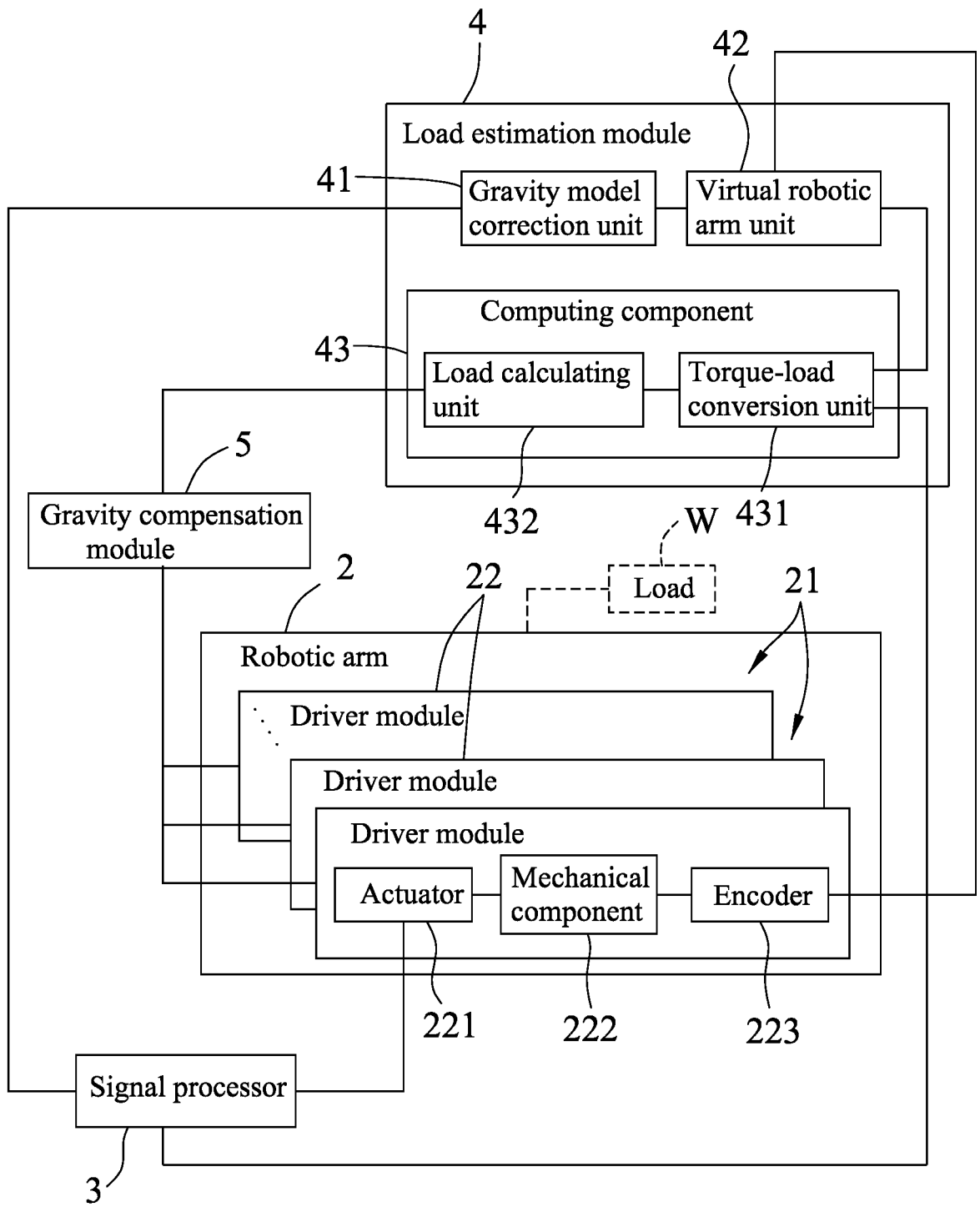
FIG. 1 is a block diagram illustrating components of a robotic arm and a load estimation and gravity compensation system to be used with the robotic arm, according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating components of a robotic arm 2 and a load estimation and gravity compensation system to be used with the robotic arm 2, according to one embodiment of the disclosure.

The robotic arm 2 includes one or more joints 21, two or more connecting rods (not shown), each two of which are connected to each other through a corresponding joint 21, and one or more driver modules 22, each of which is installed on a corresponding joint 21. FIG. 1 illustrates three driver modules 22 that are respectively installed on three different joints 21. For the sake of simplicity of illustration, the following description will, for the most part, if not all, be made with respect to only one driver module 22 and the corresponding joint 21. However, it should be appreciated that the features described in the following may be equally or similarly applied to all driver modules 22 and joints 21.

The driver module 22 includes an actuator 221, a mechanical component 222 connected to the actuator 221 (such as a connecting rod and/or a decelerator), and an encoder 223 connected to the mechanical component 222.

The load estimation and gravity compensation system includes a signal processor 3 that is coupled to the actuator 221 of the driver module 22, a load estimation module 4 that corresponds with the joint 21 and that is coupled to the signal processor 3, and a gravity compensation module 5 that is coupled to the load estimation module 4 and the driver module 22.

The term "signal processor" may refer to any device or portion of a device that processes electronic data from registers and/or memory to transform that electronic data into other electronic data. For example, the signal processor 3 is, but not limited to, a single-core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Certain embodiments of the described operations of the load estimation module 4 and the gravity compensation module 5 may be implemented in one or a combination of hardware, firmware and software. Other embodiments may also be implemented as instructions stored in a computer-readable storage device that may be read and executed by at least one processor to perform the operations described herein. A computer-readable storage device may include any non-transitory memory mechanism for storing data in a form readable by a machine (e.g., a computer). For example, a computer-readable storage device may include read-only memory (ROM), random-access memory (RAM), magnetic disk storage media, optical storage media, flash memory devices, and other storage devices and media.

It is noted that in embodiments that a plurality of joints 21 are present, the load estimation and gravity compensation system may include a plurality of load estimation modules 4 each corresponding to a respective one of the joints 21.

In operation, when the robotic arm 2 is subjected to a current load, the actuator 221 is configured to output a first torque signal. The encoder 223 is configured to output a first joint angle associated with an angular position of the joint 21. When the robotic arm 2 is to be subjected to an unknown load (W), the actuator 221 of the driver module 22 transmits a control signal to the mechanical component 222 to drive movement of the robotic arm 2. The actuator 221 is further configured to output a second torque signal associated with the joint 21 and the unknown load (W). The encoder 223 is configured to output a second joint angle associated with another angular position of the joint 21.

The signal processor 3 is programmed to convert the first and second torque signal from the actuator 221 into first and second torque values.

The load estimation module 4 includes a gravity model correction unit 41, a virtual robotic arm unit 42 connected to the gravity model correction unit 41, and a computing component 43 connected to the virtual robotic arm unit 42.

The gravity model correction unit 41 is configured to generate a set of correction parameters based on the first torque value. The virtual robotic arm unit 42 is configured to generate a no-load torque value and a maximum-load torque value based on the set of correction parameters and the first joint angle. Specifically, the no-load torque value refers to a torque value that is outputted by the robotic arm 2 when the robotic arm 2 is subjected to no load, and the maximum-load torque value refers to a torque value that is outputted by the robotic arm 2 when the robotic arm 2 is subjected to a load having a weight equal to a maximum load that can be carried by the robotic arm 2 (i.e., the payload of the robotic arm 2).

The computing component 43 includes a torque-load conversion unit 431, and a load calculating unit 432 connected to the torque-load conversion unit 431. With the no-load torque value and the maximum-load torque value available, the torque-load conversion unit 431 is capable of calculating a load difference based on two different torque values (i.e., the first and second torque values) detected under two different loads. The load calculating unit 432 is then to calculate the estimated load value by the current load and the load difference (i.e., a weight of one of the two loads when another one of the two loads is known).

The gravity compensation module 5 is configured to generate a compensating torque value based on a weight of the load and second the joint angle, and to output the compensating torque value to the driver module 22, so as to enable to the robotic arm 2 to operate with the effect of gravity compensation.

Figure 2:
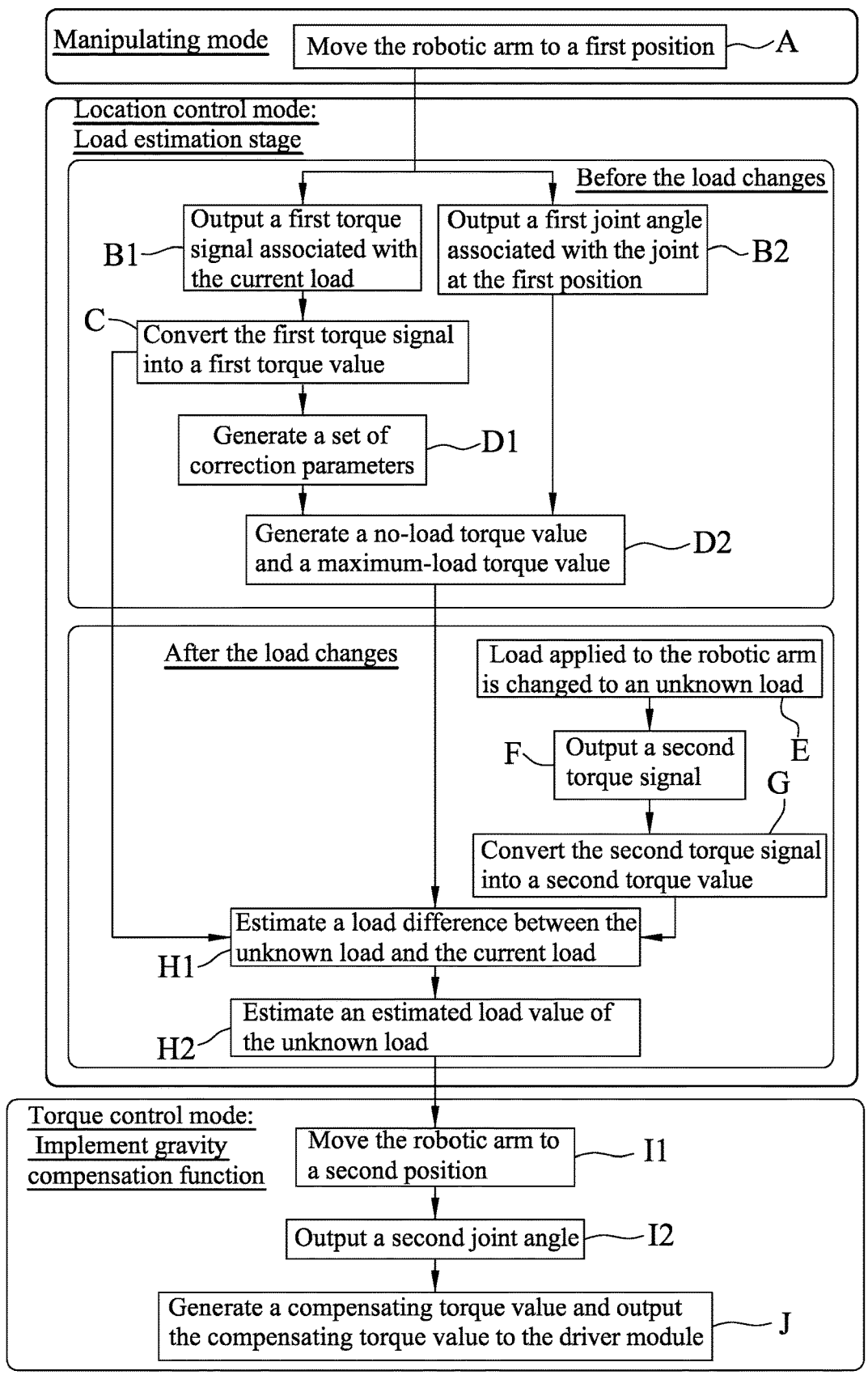
FIG. 2 is a flow chart illustrating steps of a method for load estimation and gravity compensation according to one embodiment of the disclosure.

FIG. 2 is a block diagram illustrating steps of a method for load estimation and gravity compensation on a robotic arm 2 according to one embodiment of the disclosure. In this embodiment, the method is implemented by the load estimation and gravity compensation system as illustrated in FIG. 1.

In step A, the driver module 22 is operated in a manipulating mode to move the robotic arm 2 to a first position (e.g., by an operator). In this stage, a load applied to the robotic arm 2 is defined as a current load ($W_c$). The load may be constituted by one or more physical elements.

Figure 3A:
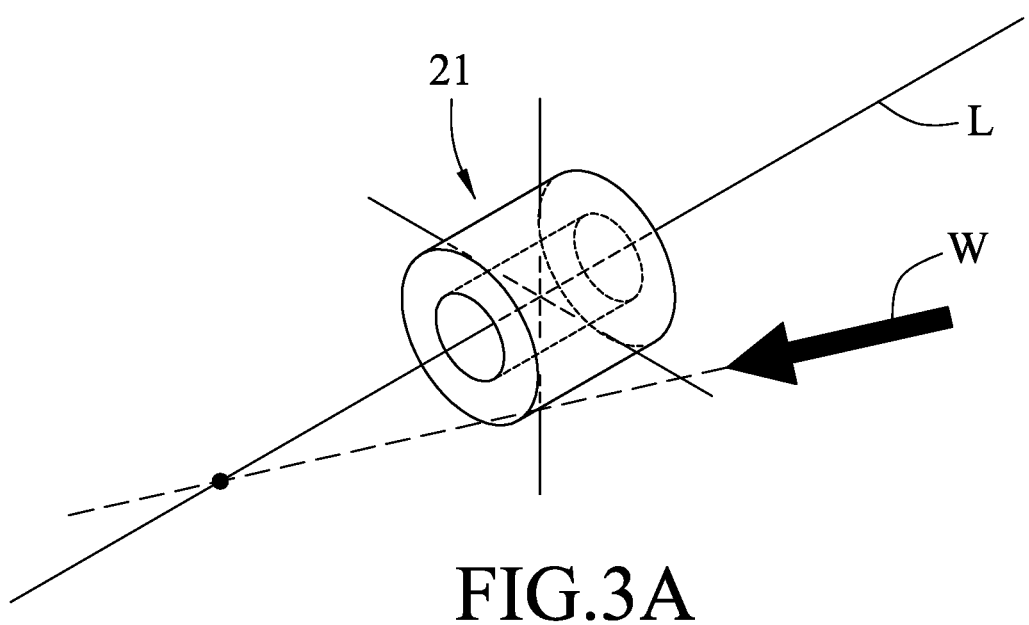
FIGS. 3A and 3B illustrate a load being applied to a joint of the robotic arm in different directions with respect to an output shaft of the joint that are unacceptable.
Figure 3B:
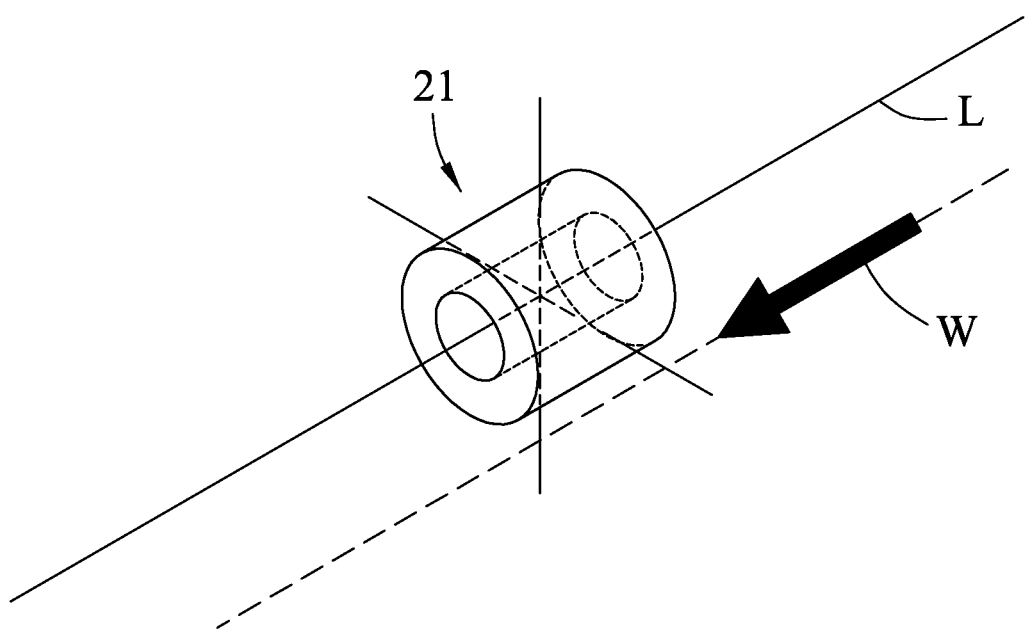

It is noted that, in order for the load to be appropriately measured by the load estimation and gravity compensation system, a torque needs to be applied to the robotic arm 2. Thus, a direction of a force from the current load ($W_c$) should not intersect an axial direction (L) of an output shaft of the joint (see FIG. 3A) and should not be parallel to the axial direction (L) of the output shaft of the joint 21 (see FIG. 3B). It is noted that when a plurality of joints are present in the robotic arm, the above condition should apply to each of the joints.

At the first position, the driver module 22 is switched to a location control mode, and then in step B1, the actuator 221 outputs a first torque signal associated with the current load ($W_c$). Specifically, the first torque signal may be in the form of a voltage signal, an electrical current signal, or the like.

In step B2, the encoder 223 outputs a first joint angle θ associated with the joint 21 at the first position. It is noted that steps B1 and B2 may be done simultaneously by the corresponding components.

In step C, the signal processor 3 receives the first torque signal from the actuator 221, and converts the first torque signal into a first torque value $C_c(\theta)$. In this embodiment, the first torque signal is a current signal passing through the actuator 221 and including an electrical current value, and the operation of converting the first torque signal into the first torque value $C_c(\theta)$ includes the signal processor 3 calculating the first torque value $C_c(\theta)$ based on the electrical current value of the first torque signal and a torque parameter associated with the actuator 221.

In step D1, the gravity model correction unit 41 receives the first torque value $C_c(\theta)$ and generates a set of correction parameters. Specifically, two different parameters α and β are generated.

In step D2, the virtual robotic arm unit 42 receives the set of correction parameters and the first joint angle θ, and generates a no-load torque value $G_0(\theta)$ and a maximum-load torque value $G_{max}(\theta)$.

Specifically, for a five-axel robotic arm 2, the set of correction parameters (α and β) the no-load torque value $G_0(\theta)$ and the maximum-load torque value $G_{max}(\theta)$ may be calculated by the load estimation module 4, using a set of equations that are derived based on forward kinematics and that are associated with the joint angle and a torque outputted by the joint 21.

It is noted that, the above calculations are done based on an assumption that only the effect of gravity exerted on the robotic arm 2 is considered. In order to obtain more accurate results, other effects such as hysteresis are also taken into consideration. Accordingly, a correction model can be expressed as $$G_{max}(\theta)=\alpha*GravityModel(\theta,W_{max})+\beta;$$

$$G_0(\theta)=\alpha*GravityModel(\theta,0)+\beta;$$

where GravityModel represents the correction model as a function, $G_{max}(\theta)$ represents the maximum-load torque value, $G_0(\theta)$ represents the no-load torque value, and $W_{max}$ represents the maximum load.

Using the above correction model, in step D1, the gravity model correction unit 41, upon receipt of the first torque value $C_c(\theta)$, is able to generate the set of correction parameters α and β.

In step E, the load applied to the robotic arm 2 is changed to an unknown load $W_u$.

In step F, while the robotic arm 2 is subjected to the unknown load $W_u$, the actuator 221 of the driver module 22 outputs a second torque signal to the signal processor 3. The second torque signal is associated with the unknown load $W_u$. In this embodiment, the second torque signal is a current signal passing through the actuator 221 and including an electrical current value.

In step G, the signal processor 3 converts the second torque signal into a second torque value $C(\theta)$ in a manner similar to step C.

In step H1, the torque-load conversion unit 431 estimates a load difference between the unknown load $W_u$ and the current load $W_c$ based on the first torque value $C_c(\theta)$, the no-load torque value $G_0(\theta)$, the maximum-load torque value $G_{max}(\theta)$ and the second torque value $C(\theta)$.

Specifically, the torque-load conversion unit 431 is configured to establish a parametric equation based on the maximum load $W_{max}$, the no-load torque value $G_0(\theta)$ and the maximum-load torque value $G_{max}(\theta)$. The parametric equation establishes a relationship between a load applied to the robotic arm 2 (e.g., in terms of weight) and a corresponding torque outputted by the joint 21.

Subsequently, the torque-load conversion unit 431 applies each of the first torque value $C_c(\theta)$ and the second torque value $C(\theta)$ to the parametric equation, so as to obtain a load difference between the current load $W_c$ and the unknown load $W_u$.

Then, in step H2, the load calculating unit 432 estimates an estimated load value $W_e$ of the unknown load $W_u$. Specifically, the load calculating unit 432 is configured to calculate the estimated load value $W_c$ by adding up the current load $W_c$ and the load difference.

In step I1, the driver module 22 is switched to a torque control mode. Under the torque control mode, the robotic arm 2 is moved from the first position to a second position (e.g., by the operator).

In step I2, the encoder 223 of the driver module 22 outputs a second joint angle θ' corresponding with the joint 21.

In step J, the gravity compensation module 5 generates a compensating torque value based on the estimated load value $W_e$ and the second joint angle θ', and outputs the compensating torque value to the driver module 22. It is noted that techniques regarding the generation of the compensating torque value are known in the related art, and details thereof are omitted herein for the sake of brevity.

Specifically, the gravity compensation module 5 is configured to calculate the compensating torque value further based on the estimated load value $W_e$, the second joint angle θ', the axial direction of the output shaft of the joint 21, the weight of each of the connecting rods, and the position of a center of mass of each of the connecting rods. In some embodiments, where there are more than one joint 21 in the robotic arm 2, the compensating torque value is calculated further based on a number of the joints 21, an axial direction of an output shaft of each of the joints 21, and the second joint angle of each of the joints 21.

The estimation may be expressed by the following equation:

$$W_u \cong W_e = W_c + W_{max} \times [(C(\theta) - C_c(\theta))/(G_{max}(\theta) - G_0(\theta))],$$

where the unknown load $W_u$ is estimated using the estimated load value $W_e$, which is obtained by adding the current load $W_c$ and the load difference.

The load difference is expressed by the following expression:

$$W_{max} \times [(C(\theta) - C_c(\theta))/(G_{max}(\theta) - G_0(\theta))]$$

The first torque value $C_c(\theta)$ is calculated by $$C_c(\theta) = A_c \times T_c,$$

where $A_c$ is the electrical current value included in the first torque signal and $T_c$ is the torque parameter associated with the actuator 221, which may be a constant. Similarly, the second torque value $C(\theta)$ is calculated by $$C(\theta) = A \times T_c,$$

where A is the electrical current value of the second torque signal.

In brief, the method as described above provides a way to estimate the weight of the unknown load $W_u$ (i.e., the estimated load value $W_e$) and to subsequently calculate the compensating torque value to be outputted to the driver module 22 in response to the change in the load applied to the robotic arm 2. It is worth noting that the method does not require the weight of the unknown load $W_u$ to be measured beforehand, and no calibration process is needed for the change in load.

Additionally, by measuring a torque outputted by the joint 21 using a current signal, no additional torque sensor is needed to be installed on the joint 21.

It is noted that the robotic arm 2 may be applied in various applications such as surgical process, rehabilitation process and industrial process.

Figure 4:
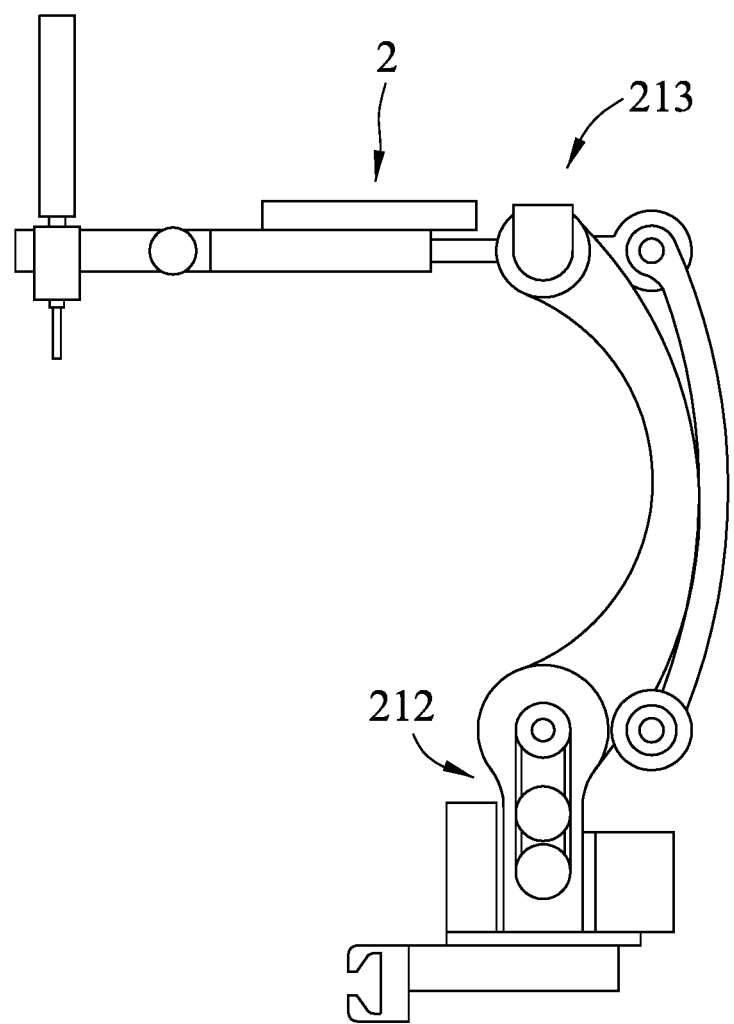
FIG. 4 is a schematic view of a robotic arm being at a first position.

The following paragraphs describe an actual implementation of the method, using a robotic arm 2 illustrated in FIG. 4.

Figure 5:
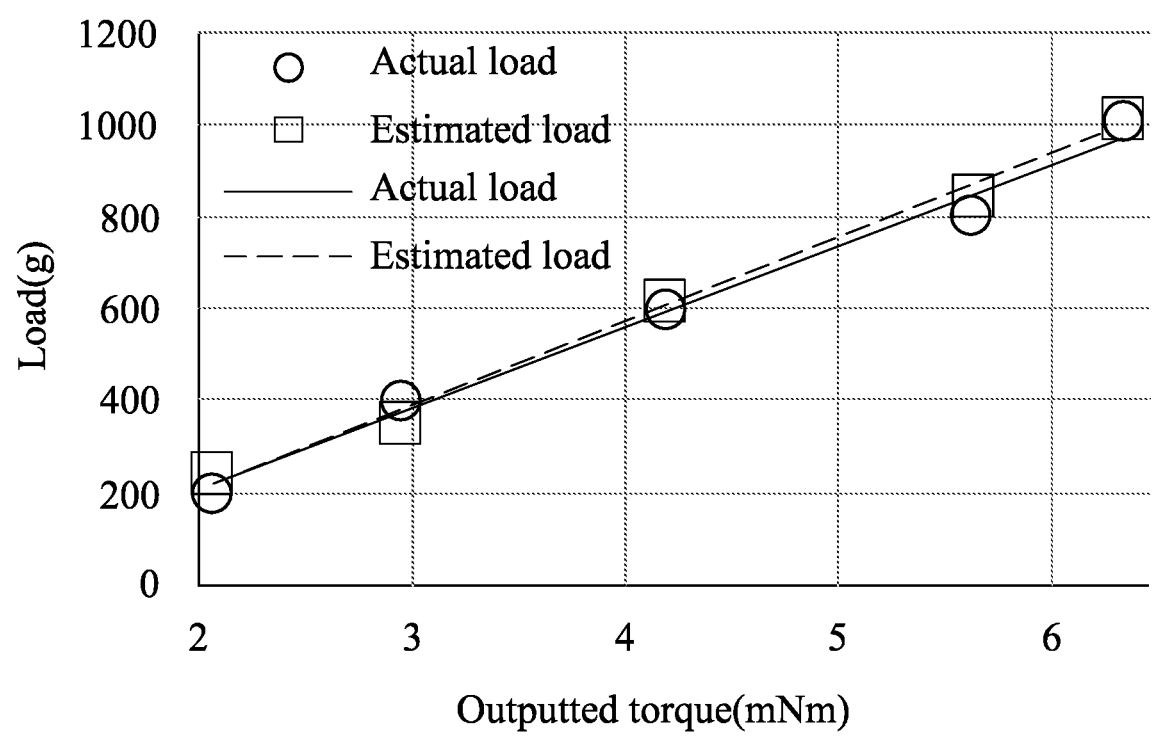
FIG. 5 is a line chart illustrating weights of a number of loads and a number of corresponding estimated load values.

The robotic arm 2 includes two joints 212 and 213, and is at the first position. At the first position, the first angle value for the joint 212 is π/2, and the first angle value for the joint 213 is 0. With other parameters given (e.g., the maximum allowed load (i.e., payload) is 1.6 kg, the torque parameter is 20.8 mNm/A, etc.), different real loads with various weights are separately applied to the robotic arm 2, and the torque signal outputted by the joint 213 in response to each of the loads is recorded and used for estimating the applied loads, as shown in the following Table 1 and illustrated in FIG. 5.

TABLE 1

| Electrical current (mA) | Converted torque (mNm) | Actual load (g) | Estimated load (g) | Estimation error (%) |
|---|---|---|---|---|
| 215 | 2.06 | 200 | 239 | 20 |
| 306 | 2.94 | 400 | 346 | 13 |
| 435 | 4.18 | 600 | 615 | 2.5 |
| 584 | 5.62 | 800 | 841 | 5 |
| 657 | 6.32 | 1000 | 1013 | 1.3 |

Figure 6:
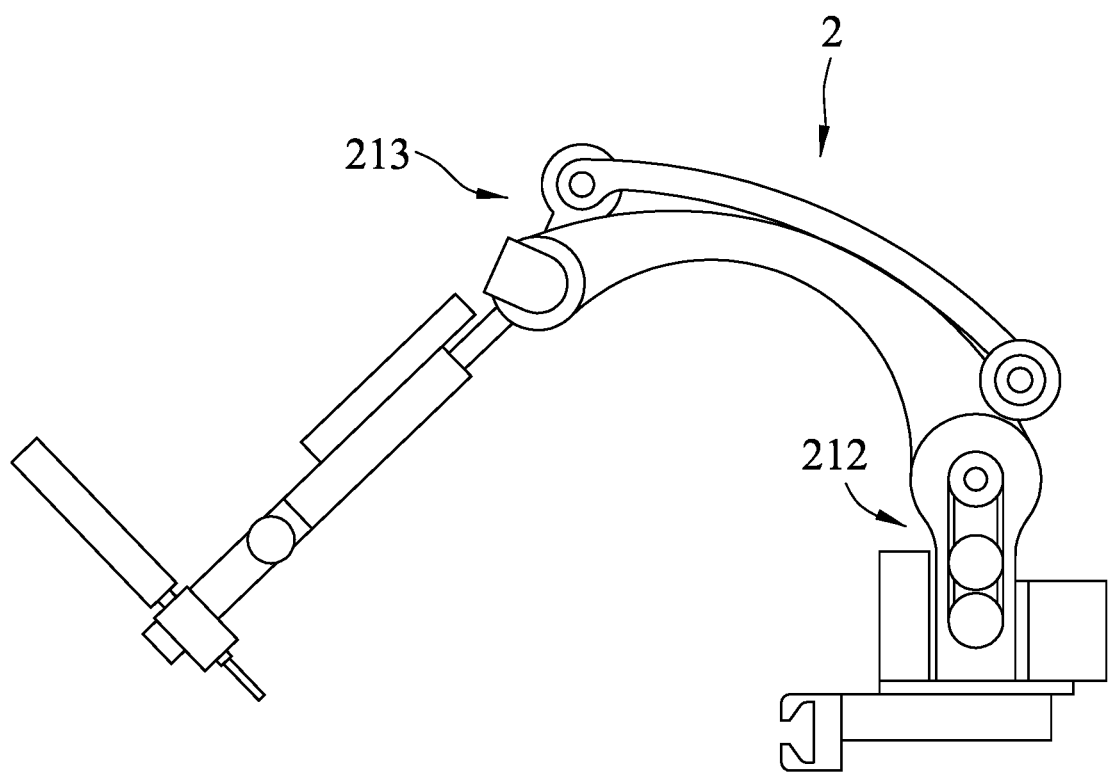
FIG. 6 is a schematic view of the robotic arm being at a second position.
Figure 7:
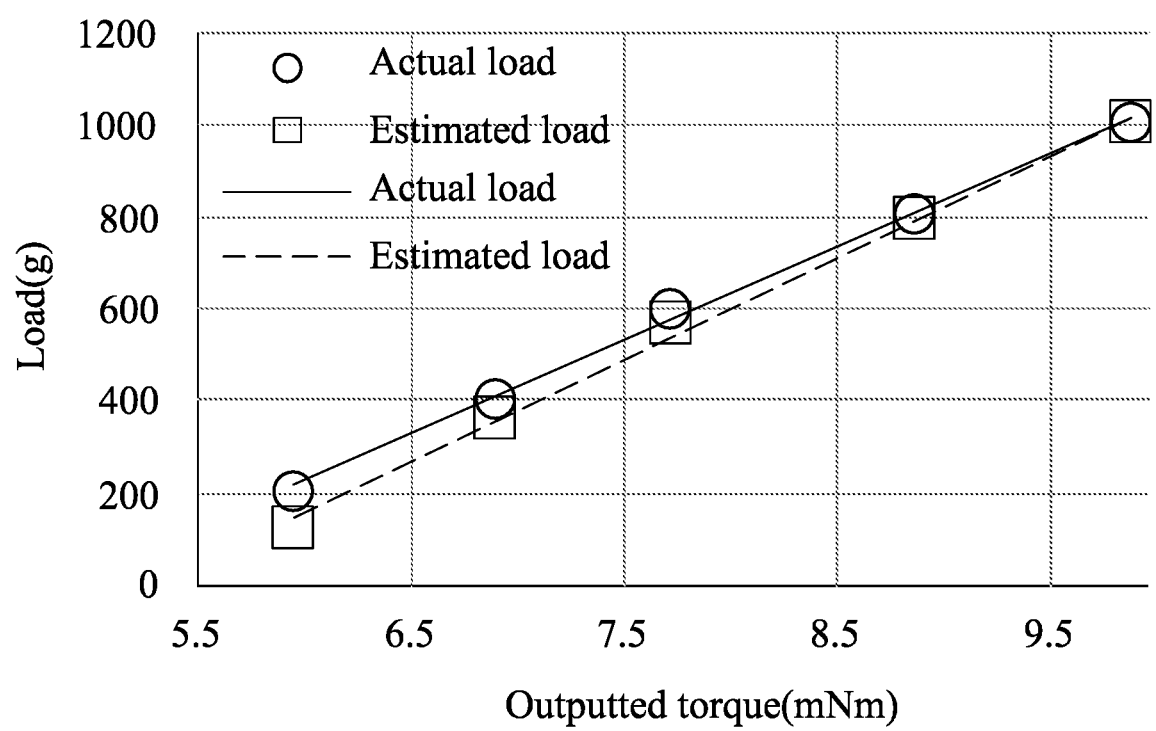
FIGS. 7 and 8 are line charts illustrating weights of a number of loads and a number of corresponding estimated load values.
Figure 8:
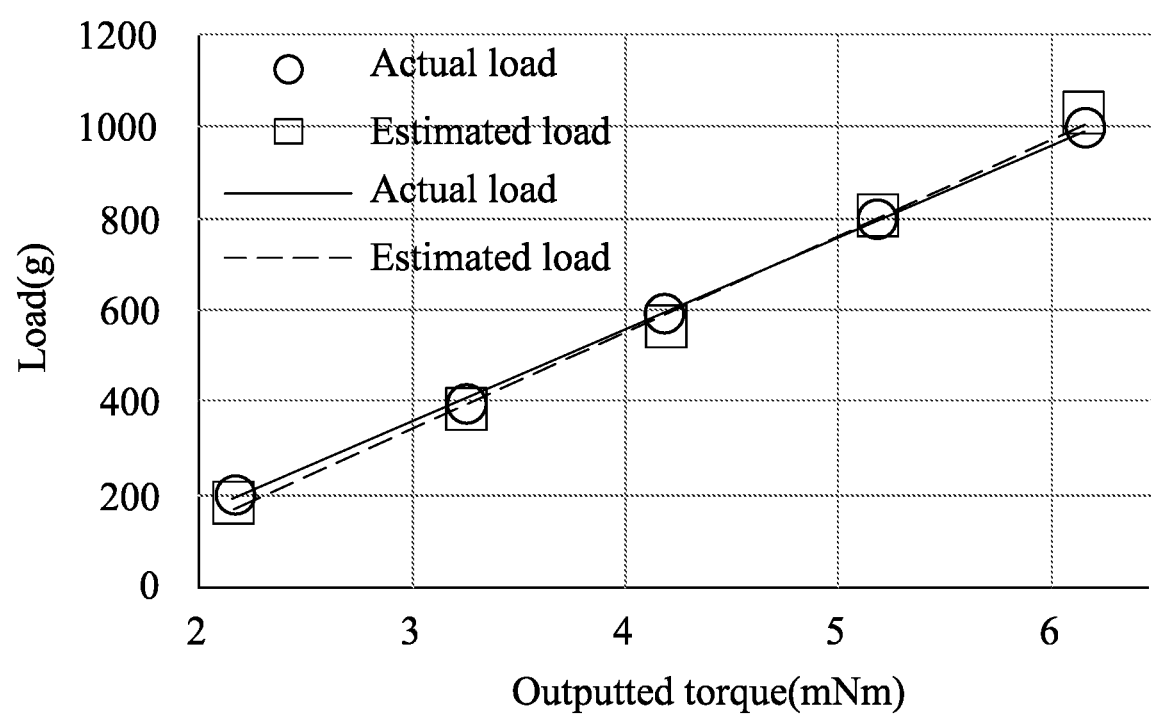

FIG. 6 illustrates the robotic arm 2 being at the second position. In this position, the first angle value for the joint 212 is π/8, and the first angle value for the joint 213 is 9π/40. With other parameters unchanged, the loads as above are applied to the robotic arm 2, and the torque signal outputted by the joint 212 in response to each of the loads is used for estimating the applied loads, as shown in the following Table 2 and illustrated in FIG. 7. Additionally, the torque signal outputted by the joint 213 in response to each of the loads is used for estimating the applied loads, as shown in the following Table 3 and illustrated in FIG. 8.

TABLE 2

| Electrical current (mA) | Converted torque (mNm) | Actual load (g) | Estimated load (g) | Estimation error (%) |
|---|---|---|---|---|
| 619 | 5.95 | 200 | 122.8 | 38.6 |
| 715.6 | 6.88 | 400 | 363.2 | 9.2 |
| 801.8 | 7.71 | 600 | 569.4 | 5.1 |
| 920.6 | 8.85 | 800 | 790.4 | 1.2 |
| 1026 | 9.86 | 1000 | 1002.9 | 0.29 |

TABLE 3

| Electrical current (mA) | Converted torque (mNm) | Actual load (g) | Estimated load (g) | Estimation error (%) |
|---|---|---|---|---|
| 225.8 | 2.17 | 200 | 186.682 | 6.66 |
| 339.4 | 3.26 | 400 | 387.388 | 3.15 |
| 436.8 | 4.2 | 600 | 566.487 | 5.59 |
| 541.2 | 5.2 | 800 | 813.318 | 1.66 |
| 641.6 | 6.17 | 1000 | 1032.31 | 3.23 |

It is noted that the above results show that the method provides a reasonably accurate estimation for the unknown load except for the case when the actual load is 200 g. This may be due to the effect of the maximum static friction that prevents the robotic arm 2 from moving, since a force attributed to a small load may not be sufficient to overcome the maximum static friction. However, in such case, although there is an error in the estimation, the small load may not cause unexpected movement of the robotic arm 2, and thus the error is acceptable. In other cases, while larger loads (400 g to 1000 g) may result in unexpected movements, the weight of the loads can be estimated with higher accuracy, and therefore can be compensated appropriately.

It is noted that in other embodiments, the robotic arm 2 may take other forms and/or include a different number of joint (s) 21, and should not be limited to the form as illustrated in FIGS. 4 and 6.

To sum up, embodiments of the disclosure provide a method for performing estimation on the unknown load based on the torque signals, which may be in the form of a current signal having an electrical current value, outputted by the actuator 221 under different loads. Subsequently, the estimated load value $W_e$ may be obtained based on the first torque value $C_c(\theta)$, the second torque value $C(\theta)$, the set of correction parameters ($\alpha$ and $\beta$), the no-load torque value $G_0(\theta)$ and the maximum-load torque value $G_{max}(\theta)$. After the estimated load value $W_e$ is obtained, the gravity compensation module 5 is configured to generate the compensating torque value based on the estimated load value $W_e$ and the second joint angle $\theta'$, thereby enabling the robotic arm 2 to operate appropriately under the unknown load. The method described in the disclosure may be implemented without installing a torque sensor to measure the torque outputted by the joint 21.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for load estimation and gravity compensation on a robotic arm, the method to be implemented by a load estimation and gravity compensation system, the robotic arm including at least one joint and a driver module that is installed on the at least one joint, the load estimation and gravity compensation system including a signal processor that is coupled to the driver module, a load estimation module that corresponds with the at least one joint and that is coupled to the signal processor, and a gravity compensation module that is coupled to the load estimation module, the load estimation module including a gravity module correction unit, a virtual robotic arm unit and a computing component, the method comprising steps of:
    operating the driver module in a manipulating mode to move the robotic arm to a first position, and switching the driver module to a location control mode, the robotic arm being subjected to a current load at the first position;
    receiving a first torque signal and a first joint angle outputted by the driver module in the location control mode, the first torque signal being associated with the current load, the first joint angle being associated with the joint at the first position;
    upon receipt of the first torque signal, converting, by the signal processor, the first torque signal into a first torque value;
    upon receipt of the first torque value, generating, by the gravity module correction unit, a set of correction parameters;
    upon receipt of the set of correction parameters and the first joint angle, generating, by the virtual robotic arm unit, a no-load torque value and a maximum-load torque value;
    changing the load subjected to the robotic arm to an unknown load;
    receiving a second torque signal outputted by the driver module, the second torque signal being associated with the unknown load;
    upon receipt of the second torque signal, converting, by the signal processor, the second torque signal into a second torque value;
    estimating, by the computing component, an estimated load value of the unknown load based on the first torque value, the no-load torque value, the maximum-load torque value and the second torque value;
    switching the driver module to a torque control mode, and moving the robotic arm to a second position;
    receiving a second joint angle outputted by the driver module, the second joint angle being associated with the second position; and
    generating, by the gravity compensation module, a compensating torque value based on the estimated load value and the second joint angle, and outputting the compensating torque value to the driver module.

2. The method of claim 1, wherein the step of estimating an estimated load value includes obtaining a load difference between the unknown load and the current load, and estimating the estimated load value by adding up the current load and the load difference.

3. The method of claim 2, the computing component including a torque-load conversion unit and a load calculating unit, wherein the step of estimating an estimated load value includes sub-steps of:
    calculating, by the torque-load conversion unit, the load difference based on the first torque value, the no-load torque value, the maximum-load torque value and the second torque value; and
    calculating, by the load calculating unit, the estimated load value by adding the current load and the load difference.

4. The method of claim 3, wherein the sub-step of calculating the load difference includes:
    establishing a parametric equation based on a maximum load that can be applied to the robotic arm, the no-load torque value and the maximum-load torque value; and
    applying each of the first torque value and the second torque value to the parametric equation, so as to obtain the load difference.

5. The method of claim 1, the robotic arm including at least two connecting rods connected to each other through the at least one joint,
    wherein the step of generating a compensating torque value includes calculating the compensating torque value further based on an axial direction of an output shaft of the at least one joint, a weight of each of the connecting rods, and a position of a center of mass of each of the connecting rods.

6. The method of claim 5, wherein a direction of a force from each of the current load and the unknown load does not intersect and is not parallel to the axial direction of the output shaft of the at least one joint.

7. The method of claim 5, the robotic arm including a plurality of joints, and a plurality of connecting rods connected to one another through the joints, wherein the step of generating a compensating torque value includes calculating the compensating torque value further based on a number of the joints, an axial direction of an output shaft of each of the joints, and the second joint angle of each of the joints.

8. The method of claim 1, the driver module including an actuator, a mechanical component connected to the actuator, and an encoder connected to the mechanical component, wherein:

in the manipulating mode, the actuator outputs a control signal to the mechanical component so as to move the robotic arm to the first position;

in the step of receiving a first torque signal and a first joint angle, the first torque signal is outputted by the actuator, and the first joint angle is outputted by the encoder;

in the step of receiving a second torque signal, the second torque signal is outputted by the actuator; and in the step of receiving a second joint angle, the second joint angle is outputted by the encoder.

9. The method of claim 8, wherein:

each of the first torque signal and the second torque signal outputted by the actuator is a current signal including an electrical current value;

the step of converting the first torque signal into a first torque value includes calculating, by the signal processor, the first torque value based on the electrical current value of the first torque signal and a torque parameter associated with the actuator; and the step of converting the second torque signal into a second torque value includes calculating, by the signal processor, the second torque value based on the electrical current value of the second torque signal and the torque parameter.

10. A load estimation and gravity compensation system for use with a robotic arm, the robotic arm including at least one joint and a driver module that is installed on the at least one joint, the load estimation and gravity compensation system comprising:

a signal processor to be coupled to the driver module for receiving a first torque signal and a first joint angle therefrom when the robotic arm is subjected to a current load, and for converting the first torque signal to a first torque value, wherein said signal processor further receives a second torque signal and a second joint angle from the driver module when the robotic arm is subjected to an unknown load, and converts the second torque signal to a second torque value;

a load estimation module that corresponds with the at least one joint, that is coupled to said signal processor for receiving the first and second torque values therefrom, and that is programmed to generate a set of correction parameters based on the first torque value, generate a no-load torque value and a maximum-load torque value based on the set of correction parameters and the first joint angle, and estimate an estimated load value of the unknown load based on the first torque value, the no-load torque value, the maximum-load torque value and the second torque value; and a gravity compensation module coupled to said load estimation module for generating a compensating torque value based on the estimated load value and the second joint angle, and outputting the compensating torque value to the driver module.

11. The load estimation and gravity compensation system of claim 10, wherein said load estimation module is programmed to obtain a load difference between the unknown load and the current load, and estimating the estimated load value by adding the current load and the load difference.

12. The load estimation and gravity compensation system of claim 11, wherein said load estimation module includes:

a torque-load conversion unit programmed to calculate the load difference based on the first torque value, the no-load torque value, the maximum-load torque value and the second torque value; and a load calculating unit programmed to calculate the estimated load value by adding the current load and the load difference.

13. The load estimation and gravity compensation system of claim 12, wherein calculating the load difference includes said torque-load conversion unit:

establishing a parametric equation based on a maximum load that can be applied to the robotic arm, the no-load torque value and the maximum-load torque value; and applying each of the first torque value and the second torque value to the parametric equation, so as to obtain the load difference.

* * * * *